April 23, 1963  W. R. ZALESKI  3,086,671
PLASTIC BOTTLE
Filed Aug. 17, 1962

INVENTOR
WALTER ZALESKI
ATTORNEY

United States Patent Office
3,086,671
Patented Apr. 23, 1963

3,086,671
PLASTIC BOTTLE
Walter R. Zaleski, Freehold, N.J., assignor to Hyspect Container Corporation, Keyport, N.J., a corporation of New Jersey
Filed Aug. 17, 1962, Ser. No. 217,601
1 Claim. (Cl. 215—31)

This invention relates to a plastic bottle. More particularly, this invention relates to a plastic bottle having a handle and a mouth configuration to which a conventional closure member may be affixed of the type commonly employed in connection with milk bottles.

For a long period of time glass bottles have been the common container for carrying milk in quantities of approximately one gallon. Formerly, glass bottles also possessed the complete domain of quart size and half-gallon milk bottles. Recently, various milk cartons have been developed made from either polyethylene coated paper board or wax paper board. In the domain of the one gallon size milk bottle, the glass bottle still reigns supreme inasmuch as the paper back cartons cannot be made sufficiently rigid to encompass a full gallon of milk.

While glass bottles for milk certainly possess sanitary and attractive display carrying means, unfortunately, a glass bottle is fairly expensive so that it is necessary to provide for the reuse of such bottles. In other words, the consuming public must return the empty milk bottle in order to obtain a deposit therefor or to exchange it for a new filled bottle of milk. It will be appreciated that it is displeasing for the consuming public to be forced into the position of having to return empty milk bottles to the store and to generally provide clean milk bottles so that they must be washed out before they are returned. Additionally, the fact that the storekeepers must return the bottles to the dairy also poses a disadvantage to the manner in which a gallon of milk is currently dispensed. It will be appreciated that a milk carrying container which need not be returned to the store will have considerable advantages over the ordinary glass bottle now currently in wide use.

Accordingly, it is a primary object of the present invention to disclose and provide a plastic bottle useful for carrying milk.

It is another object of the present invention to disclose a plastic bottle for milk which need not be returned to the store.

It is yet another object of the present invention to provide a milk bottle having a unique mouth configuration and neck construction so that strength and rigidity is provided and the conventional cap enclosure elements now commonly associated with milk bottles may also be used in conjunction with the milk bottle of the present invention.

Additional objects and advantages will become apparent from a detailed consideration of the invention as set forth below taken in conjunction with the drawings wherein.

Figure 1:
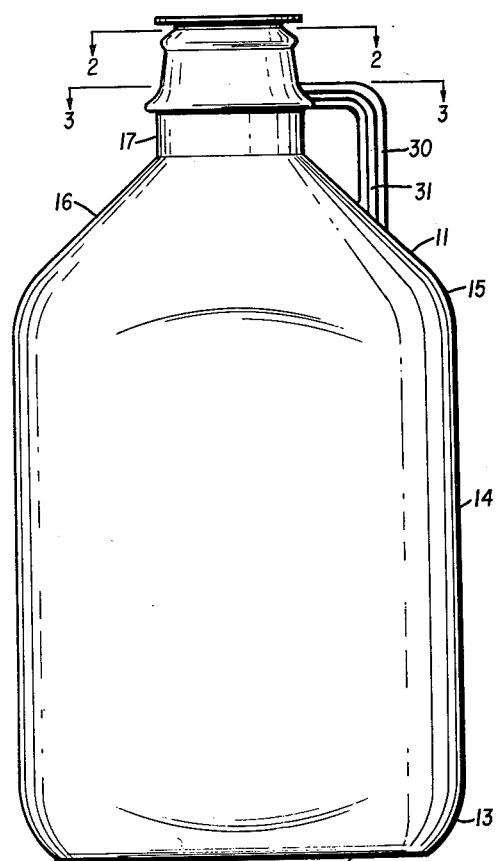
FIGURE 1 represents a side elevation of the plastic milk bottle of the present invention.

Attention is now directed to FIGURE 1 wherein it will be seen that the plastic milk bottle is designated in general by reference numeral 11. The plastic bottle has a general square or rectangularly-shaped configuration having a bottom 12, an upwardly and outwardly extending curve portion 13 and vertical walls 14. The vertical walls culminate in curved portion 15 which extend inwardly and upwardly towards flattened portions 16 culminating in the neck having a tubular configuration 17.

Figure 4:
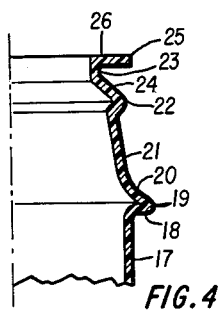
FIGURE 4 is a vertical cross-section of a portion of the neck of the plastic milk bottle of the present invention.

For a more detailed consideration of the specific configuration of the neck portion, attention is directed to FIGURE 4. It will be seen therefrom that above neck portion 17 an outwardly radially extending flange portion 18 is described having a curve 19 which further connects to a concave portion 20 which extends upwardly and inwardly and in turn communicates with an upwardly and inwardly extending flat portion 21. The flat portion 21 terminates in a second convex flange arrangement 22 which communicates with a deep sweeping inset portion 23 by means of flat surface 24. Portion 23 and the mouth of the bottle will be seen to terminate in a radially extending flange 25 having a flat closure accepting surface 26. It will be seen from a careful review of FIGURE 4 that the entire neck portion extends inwardly and upwardly providing for two convex radially extending flanges and a flat uppermost flange for the cap or closure.

Figure 2:
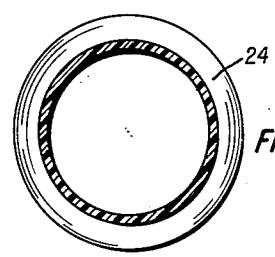
FIGURE 2 is a part cross-section taken along line 2—2 of FIGURE 1.
Figure 3:
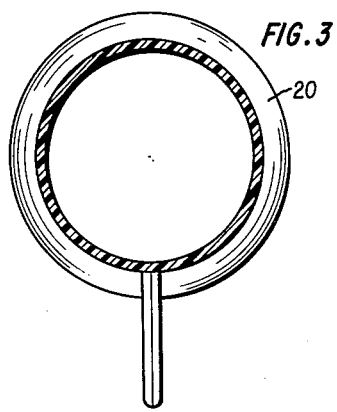
FIGURE 3 is a part cross-section taken along line 3—3 of FIGURE 1.

The fact that the neck extends inwardly and upwardly is further corroborated from a review of FIGURES 2 and 3. It will be seen that FIGURE 2 illustrates the open mouth portion having a smaller diameter than the neck portion shown in FIGURE 3.

In order to provide for unique handling characteristics of the bottle of the present invention, a handle 30 is included which makes a connection at the neck portion adjacent surface 20 and convex portion 19 and at the other end makes a connection with flat portion 16.

The bottle of the present invention is fabricated by means of a blowing operation such as is well known. In other words, a tube generally of linear polyethylene is extruded into a sectional mold which is then blown to assume the configuration of the mold when the sectional mold has been suitably closed. The handle is fabricated in such a manner so that each section of the mold provides one-half of the handle taken along the longitudinal section thereof. Additionally, it will be seen that the handle 30 in the plastic milk bottle of the present invention has a rib portion 31 extending transversely from the handle at both sides thereof.

It will be apparent that many changes and modifications of the several features described herein may be made without departing from the spirit and scope of the invention. It is therefore apparent that the foregoing description is by way of illustration of the invention rather than limitation of the invention.

What is claimed is:

A plastic bottle having a neck portion comprising an uppermost flat surface extending outwardly and radially and perpendicular with respect to the axis of the plastic bottle, an indentation extending inwardly and radially beneath the upper surface, directly therebelow a flattened portion extending outwardly and radially terminating in an undulation having an outwardly extending convex surface, a flattened portion attached thereto and extending downwardly and outwardly terminating in a radially extending flange arrangement having a concave configuration communicating with the said flange and the flattened portion, a lower transverse portion extending inwardly terminating in a flattened neck portion depending downwardly parallel with respect to the axis of the bottle and making connection with the body of the bottle and the uppermost inner periphery of the neck having a radius from the axis of the bottle less than the radius of the said lower flattened neck portion making communication with the body portion of the bottle.

No references cited.